Aug. 31, 1926.  
J. P. GERAGHTY  
1,598,572  
ENGINE HOOD LOCKING DEVICE  
Filed May 5, 1925  2 Sheets-Sheet 1
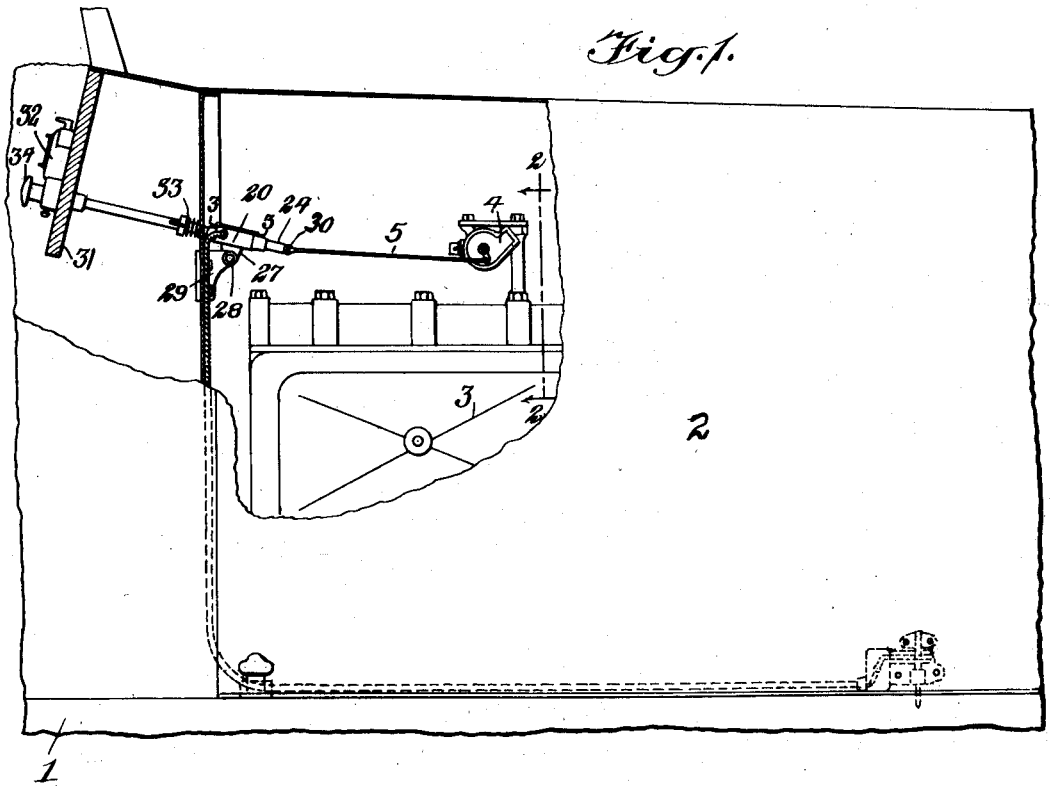
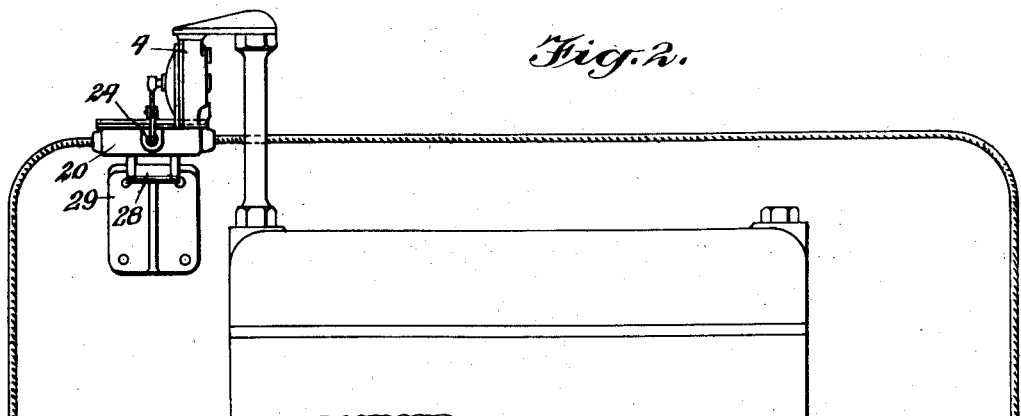
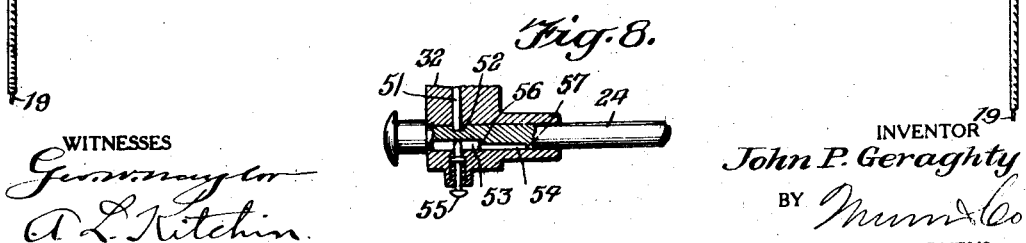
WITNESSES  
INVENTOR  
John P. Geraghty  
BY  
ATTORNEYS Aug. 31, 1926.                                                    1,598,572
J. P. GERAGHTY
ENGINE HOOD LOCKING DEVICE
Filed May 5, 1925                    2 Sheets-Sheet 2
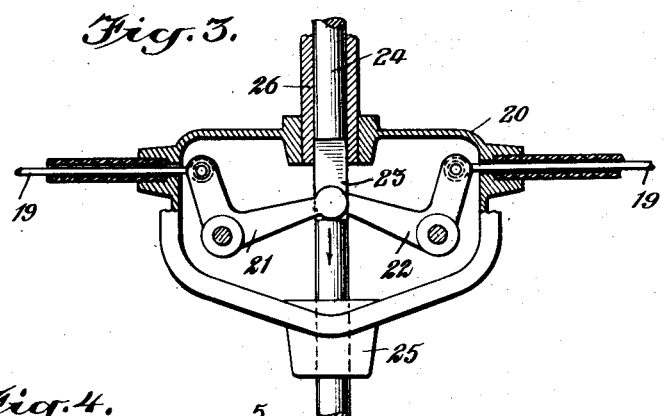
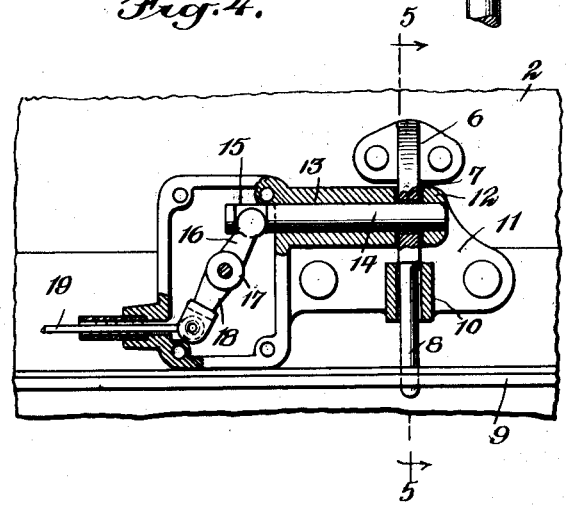
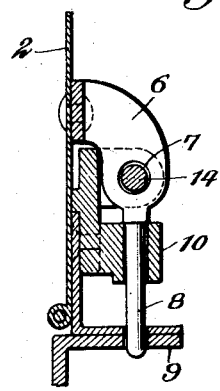
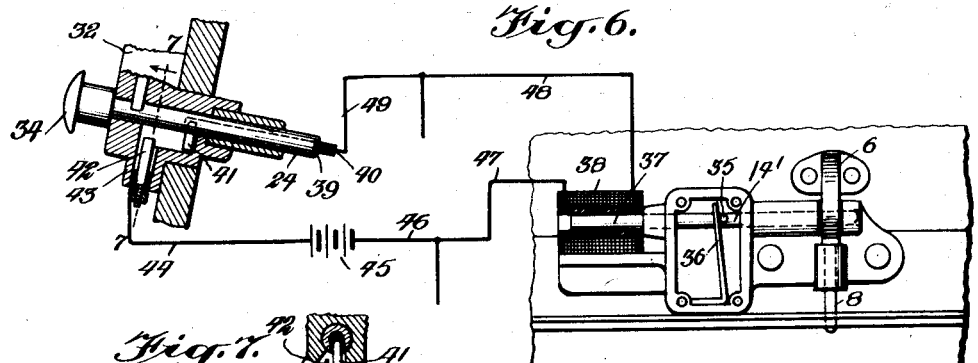
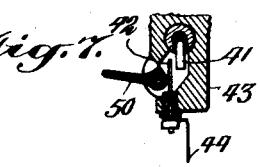
WITNESSES
INVENTOR
John P. Geraghty
BY
ATTORNEYS Patented Aug. 31, 1926.

1,598,572

UNITED STATES PATENT OFFICE.

JOHN P. GERAGHTY, OF JERSEY CITY, NEW JERSEY.

ENGINE-HOOD-LOCKING DEVICE.

Application filed May 5, 1925. Serial No. 28,160.

This invention relates to locking devices for engine hoods of automobiles and has for an object to provide an improved construction wherein the hood will be normally locked but may be manually unlocked when the engine is running.

Another object of the invention is to provide an engine hood lock for automobiles wherein means are provided which are automatically actuated for starting and stopping the engine, the structure being such that the hood may be manually unlocked after the engine starts but will remain normally locked when the engine is running.

A further object of the invention is to provide a hood lock for automobile engines wherein locking bolts are manually actuated for locking and unlocking the hood of the engine, the construction being such that these bolts are caused to function by a manually movable member associated with the switch of the engine.

In the accompanying drawings—

Figure 1 is a side view of part of an automobile with certain parts broken away, the same disclosing an embodiment of the invention.

Figure 2 is a sectional view through Figure 1, approximately on line 2—2.

Figure 3 is an enlarged fragmentary sectional view through Figure 1, approximately on line 3—3.

Figure 4 is an enlarged fragmentary view partly in section of the hood locking bolts and associated parts shown in Figure 1.

Figure 5 is a sectional view through Figure 4 on line 5—5.

Figure 6 is a schematic view showing a modified form of the invention wherein an electrical apparatus is used for throwing the hood locking bolts.

Figure 7 is a detail fragmentary sectional view through Figure 6 on line 7—7.

Figure 8 is a detail fragmentary sectional view through part of the lock shown in Figure 1, the same disclosing certain features of the invention.

Referring to the accompanying drawings by numerals, 1 indicates an automobile of any desired kind provided with a hood 2 enclosing an engine 3 which is of any desired kind. This engine is provided with any desired form of ignition and starting system which includes a switch 4 of any desired kind, as for instance, the kind shown in my co-pending application Serial No. 8,799 for opening and closing either system or both. When the rod 5 moves in one direction, the switch 4 is closed and when rod 5 is moved in the opposite direction, the switch is open.

According to the present invention, means have been provided which is associated with the switch 4 whereby when the rod 5 is moved manually a predetermined distance, certain mechanism will be actuated for either locking or unlocking the hood 2. In Figures 4 and 5, the principal part of the hood locking means is shown. From these views it will be seen that there is provided a bracket or fitting 6 which is riveted or otherwise rigidly secured to the interior of the hood 2 and provided with an aperture 7 and a pin 8 extending through part of the chassis 9. This pin acts to align the fitting 6 as the pin extends through the tubular portion 10 as well as through an aperture in the chassis 9. The tubular portion 10 is preferably formed integral with a plate 11, which plate is formed with an upstanding ear 12 and a tubular member 13. The ear 12 is provided with an aperture registering with the tubular member 13 so that the bolt 14 may be moved to the position shown in Figure 4 whereby it will extend through the aperture 7 and into the ear 12 thus locking the hood closed. The bolt 14 is proivded with a restricted portion 15 into which the arm 16 of the bifurcated member 17 extends, said bifurcated member having an arm 18 projecting therefrom connected to one end of the Bowden wire 19 whereby when said wire is pulled to the position shown in Figure 4, bolt 14 will be moved to its locked position. When this wire is pushed in the opposite direction, the bifurcated member 17 will be swung so that the bolt 14 will be retracted and thereby disengage from the bracket 6 so that the hood will be unlocked though pin 8 will remain in place until the hood has been manually or otherwise raised.

In order to actuate the Bowden wire 19 so that the bolt 14 will be moved to a locked position when the engine is stopped, a special structure has been provided as shown in Figures 1 and 3. It will be seen from Figure 2 that the Bowden wire 19 extends on each side of the hood 2 to identically constructed locking structures, said locking structures being illustrated in Figures 4 and 5. Both of the wires 19 are associated with the casing 20 as shown particularly in Figure 3. This casing encloses a pair of bell crank levers 21 and 22 having one arm of the respective levers connected to the respective wires 19 and the opposite arm mounted in notches 23 and the rod 24. There is an elongated notch 23 on diametrically opposite sides of the rod 24 so as to receive the ends of the respective bell crank levers 21 and 22. A sleeve 25 is carried by the casing 20 so as to act as a bearing for rod 24 while a suitable tube 26 at the opposite part of the casing acts as a second bearing whereby this rod may freely reciprocate when properly actuated so as to pull or push the wires 19 and, consequently, move the respective bolts 14 to a locked or unlocked position. When the parts are in the position shown in Figure 3, bolt 14 will be in its unlocked position. The casing 20 is provided with a depending ear 27 which is pivotally mounted at 28 on to a suitable bracket 29, said bracket being secured to a section of the stationary part of the hood 2 or to any other desired support. This will allow the parts to assume a correct alignment.

From Figure 1 it will be noted that the rod 5 is pivotally connected at 30 to rod 24 so that when said rod is moved in one direction a certain distance, switch 4 will be moved to a closed position whereby the engine may be started. When the engine is stopped, the parts are moved in the opposite direction and the hood is locked unless it is already locked. This will allow the driver to leave the car and will prevent anyone from opening the hood so as to start the engine. The rod 24 extends through an instrument board 31 and co-acts with a lock 32 of any desired kind, as for instance, the lock shown in my Patent No. 1,421,684. The lock 32 acts to automatically hold the rod 24 in a position for maintaining the switch 4 open and bolt 14 in a locked position. When the lock 32 is actuated for releasing the rod 24, spring 33 will immediately act to force the rod in one direction which will automatically cause the rod 5 to close the switch 4 but the movement of rod 24 is not sufficient to unlock the bolt 14.

After the engine has been started, the automobile may be used in the usual manner and when it is desired to stop the same it is only necessary to push the knob 34 so as to move rod 24 until it strikes lock 32.

The lock may then be actuated to hold the rod 24 in a locked position if it is desired to leave the car alone. When the parts have been moved as just described, switch 4 will be moved to an open position.

It has been found in actual use that the wires 19 are very desirable because this presents a positive and easily operated construction. However, it has also been found that other means might be used for locking the hood, said other means including hydraulic means, compressed air or electrical means. In Figures 6 and 7 an electrical structure is provided which will take the place of the wires 19 and associated parts for actuating the bolt 14'. This bolt is provided with a pin 35 acted on by the spring 36 which continually functions in such a manner as to move the bolt 14' to a locked position unless positively held in an unlocked position. The bolt 14' is either formed integral with or rigidly secured to a core 37 mounted to co-act with the solenoid 38. When this solenoid is energized, the bolt 14' will be moved to an unlocked position and as soon as the solenoid is deenergized, spring 36 will move the bolt to a locked position. In this form of the invention the rod 24 is preferably made hollow and is provided with an insulating core 39 carrying a wire 40 which connects with the contact plate 41 which is insulated from the rod 24. When the rod 24 is moved by spring 33 from the locked position shown in Figures 1 and 6, contact 41 will be moved until it comes opposite the contact 42. The contact 42 is insulated from the casing 43 of the lock 32 but is connected by a wire 44 to a source of current 45. Suitable wires 46 and 47 connect the sources of current 45 with one side of the solenoid 38, the opposite side being connected through wires 48 and 49 with wire 40 so that when the contacts 41 and 42 are engaged the circuit of solenoid 38 will be closed.

From Figure 7 it will be noted that the contact 42 is out of line with the contact 41 so that after rod 24 and contact 21 have been moved by spring 33 the circuit of solenoid 38 will not be closed unless the manually actuated member 50 is moved for forcing contact 42 over against contact 41. This is done manually and only when it is desired to open the hood 2. It will be noted that the hood 2 remains continually locked whether the engine is running or is standing still unless the contact shifting member 50 has been moved for shifting contact 42 to a position engaging the contact 41. By reason of this construction, current is not used except when the bolt 14' is withdrawn.

The lock 32 may be of any desired kind but must be formed with a bolt 51 which is thrust into the notch 52 of rod 24 when in locked position and is withdrawn therefrom when in an unlocked position. The rod 24 is provided with a comparatively deep slot 53 and a comparatively shallow slot 54. A spring pressed pin 55 is slidingly mounted in the frame of lock 32 and normally projects into the slot 53. When the lock 32 is unlocked and bolt 51 is thereby withdrawn from the notch 52, spring 33 will quickly move the rod 24 until the shoulder 56 strikes against the pin 55. This movement will be sufficient to close the switch 4 but will not be sufficient to move the bolt 14 out of engagement with the fixture 6. When it is desired to unlock the hood 2, pin 55 is grasped and pulled downwardly and then rod 24 is manually pulled outwardly to a greater extent while the inner end of pin 55 rides in the slot 54. As soon as the shoulder 57 strikes against the pin 55, the parts will be sufficiently moved to cause a coplete disengagement of bolt 14 from fixture 6.

From Figure 3 is will be seen that the rod 24 is provided with long notches 23 so that there will be a certain loose motion before the bell crank levers are actuated. The parts are so positioned that when the same are in locked position as shown in Figure 1 and lock 32 is operated to release rod 24, said rod will move under the action of spring 33 a certain distance or far enough to close switch 4. This movement of the rod will not cause a movement of bell crank levers 21 and 22 by reason of the long notch 23. When these levers are to be moved for retracting or withdrawing bolt 14, head 34 is grasped and rod 24 pulled longitudinally after pin 55 has been moved out of the way. When rod 24 has been thus moved manually until pin 55 strikes shoulder 57, bolt 14 will be completely withdrawn from the fitting 6 and the hood will be unlocked. This will not in any way affect the switch 4.

When it is again desired to lock the hood, the head 34 is forced completely in so that the parts will assume the position shown in Figure 1. This will not only move bolt 14 to a locked position but will open switch 4. If it is desired to start the engine, lock 32 is operated to release rod 24 so that spring 33 will move the parts so that the switch 4 will be closed. By reason of the long notches 23, this action will not cause the operation of the levers 21 and 22 and, consequently, the hood will remain locked. In case the engine is stopped when the hood is open, the bolt 14 would be moved to its locked position but would naturally not pass through the opening 7 and, consequently, the hood would not be locked. If the hood is then lowered the guide 8 will strike against the bolt 14 or some of the associated parts and will thereby hold the hood open to a greater or less extent. The hood will be held open to such an extent that anyone can readily see that the parts have been left in this position intentionally.

What I claim is:

1. A locking device for engine hoods, comprising an apertured fitting connected with the hood of the engine, a reciprocating bolt adapted to be thrust through the aperture in said fitting, means for supporting said bolt on the chassis of the car with which the engine is associated, said supporting means being arranged within said hood, a Bowden wire operatively connected with said bolt for reciprocating the same, a reciprocating rod arranged at a distant point operatively connected with said Bowden wire for actuating the same, a lock for normally holding said rod against movement in either direction, a spring for moving said rod in one direction, said rod being adapted to be manually moved in the opposite direction.

2. A locking device for engine hoods of automobiles, comprising a reciprocating bolt mounted on the chassis of the automobile, an apertured fixture connected with the hood of the automobile adapted to be positioned so that the aperture will be in line with said bolt when the hood is closed, a Bowden wire operatively connected with said bolt for reciprocating the same in order to move the same to a locked and unlocked position, a lever connected with said Bowden wire at the end opposite said bolt, a rod adapted to be moved in one direction manually, said rod being operatively connected with said lever so as to shift the same to move the Bowden wire in one direction as the rod is manually shifted, a spring acting on the rod for automatically shifting the rod in the opposite direction, and a lock for normally holding the rod against movement under the action of said spring.

3. A locking device for the hoods of automobile engines, comprising a supporting plate connected with the chassis of the automobile, a reciprocating bolt carried by said plate, a fitting connected with the hood of the automobile, said fitting having an opening which is aligned with said bolt when the hood is closed, a lever for reciprocating said bolt so as to move the same out of said aperture and into said aperture for locking and unlocking the hood, a Bowden wire connected with said lever, said Bowden wire extending to near the instrument board of the automobile, a bell crank lever having one leg connected with said Bowden wire, a reciprocating rod operatively connected with the other leg of said lever, a spring for causing said rod to move in one direction for actuating said bell crank lever, said rod being manually movable in the opposite direction, and a lock for locking said rod against movement after the same has been manually moved, said manual movement and said rod actuating the parts in such a direction as to cause said bolt to be moved to a locked position.

4. In a locking device for engine hoods, a sliding rod, a lock for locking the rod in one position and a pin for causing the rod to have two movements in one direction, a sliding bolt for locking said hood in its closed position, and means actuated by said rod for moving said bolt to a locked and an unlocked position, said bolt being formed so that it must be moved for the both movements of said rod before it is moved to an unlocked position.

JOHN P. GERAGHTY.